(12) United States Patent
Monden

(10) Patent No.: US 9,086,747 B2
(45) Date of Patent: Jul. 21, 2015

(54) INFORMATION PROCESSING DEVICE, DISPLAY DEVICE, DISPLAY SYSTEM, METHOD FOR CONTROLLING INFORMATION PROCESSING DEVICE, AND METHOD FOR CONTROLLING DISPLAY DEVICE

(75) Inventor: Kazuhiro Monden, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 642 days.

(21) Appl. No.: 13/091,599

(22) Filed: Apr. 21, 2011

(65) Prior Publication Data

US 2011/0279365 A1    Nov. 17, 2011

(30) Foreign Application Priority Data

May 17, 2010  (JP) .................. 2010-113420

(51) Int. Cl.
  *G06F 3/033* (2013.01)
  *G06F 3/038* (2013.01)
  *G06F 9/44* (2006.01)

(52) U.S. Cl.
  CPC .............. *G06F 3/038* (2013.01); *G06F 9/4445* (2013.01)

(58) Field of Classification Search
  CPC ... G06F 3/0486; G06F 3/0481; G06F 3/0482; G06F 3/04817; G06F 3/0346; G06F 3/0488; G06F 3/017; G06F 3/04845; G06F 3/1454; G06F 3/04883; G06F 3/03547; G06F 3/0383; G06F 3/041; G06F 3/04812; G06F 1/16; G06F 2203/04101; G06F 2203/04803; G06F 3/04842; G06F 3/1462; G06F 21/84; G06F 3/038; G06F 3/04892; G06F 13/385; G06F 17/3028; G06F 17/211; G06F 3/033; G06F 3/03543; G06F 9/4445; G09G 2370/04; G09G 3/002; G09G 5/08; G09G 2340/02; G09G 2370/16; G09G 5/363; H04N 7/15; H04N 9/3147; H04N 1/32363; H04N 1/00204; H04N 1/00214; H04N 1/00206; H04N 1/00209; H04N 1/00236; H04N 1/00238; H04N 1/46; H04N 2201/3278; H04N 5/235; H04M 11/007; G03B 21/14
  USPC ................... 345/156–184, 2.2, 538; 709/247; 710/20; 715/856–858
  See application file for complete search history.

(56) References Cited

U.S. PATENT DOCUMENTS 7,397,476 B2 * 7/2008 Akaiwa et al. ................ 345/536
2004/0189598 A1 * 9/2004 Fujita et al. ................... 345/156

(Continued)

FOREIGN PATENT DOCUMENTS

| CN | 1917526 A | 2/2007 |
| CN | 101303845 A | 11/2008 |
| CN | 101341457 A | 1/2009 |
| JP | 2005-257948 | 9/2005 |

OTHER PUBLICATIONS

Jul. 30, 2013 Chinese Office Action, which is enclosed with an English Translation, that issued in Chinese Patent Application No. 201110127889.6.

*Primary Examiner* — Amare Mengistu
*Assistant Examiner* — Gloryvid Figueroa-Gibson
(74) *Attorney, Agent, or Firm* — Cowan, Liebowitz & Latman, P.C.

(57) ABSTRACT

An information processing device controls, in response to an object moving instruction, a transmitting unit so that pointer position information indicating a post-movement position of a pointer and object position information indicating a post-movement position of an object are transmitted to a display device, and then, after the pointer position information and the object position information have been transmitted, image data representing an image generated by a generating unit is transmitted to the display device.

21 Claims, 11 Drawing Sheets

(56) References Cited

U.S. PATENT DOCUMENTS

| | | |
|---|---|---|
| 2004/0246229 A1 | 12/2004 | Yamada |
| 2005/0160380 A1* | 7/2005 | Konar et al. .................. 715/858 |
| 2008/0133785 A1* | 6/2008 | Kwak et al. ..................... 710/20 |
| 2009/0153475 A1* | 6/2009 | Kerr et al. ..................... 345/157 |
| 2010/0045594 A1* | 2/2010 | Jenks et al. ................... 345/156 |

* cited by examiner

FIG. 2
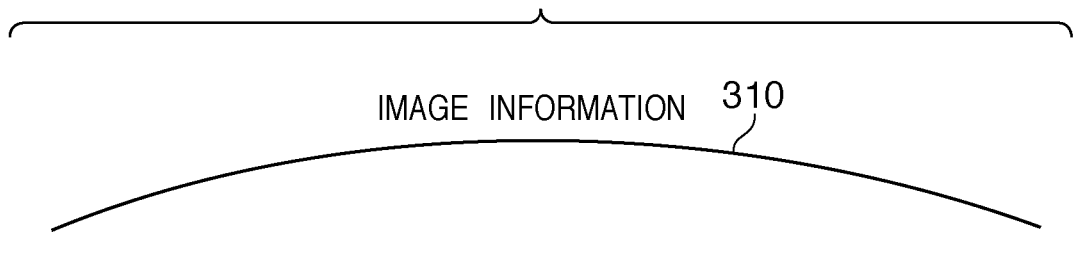
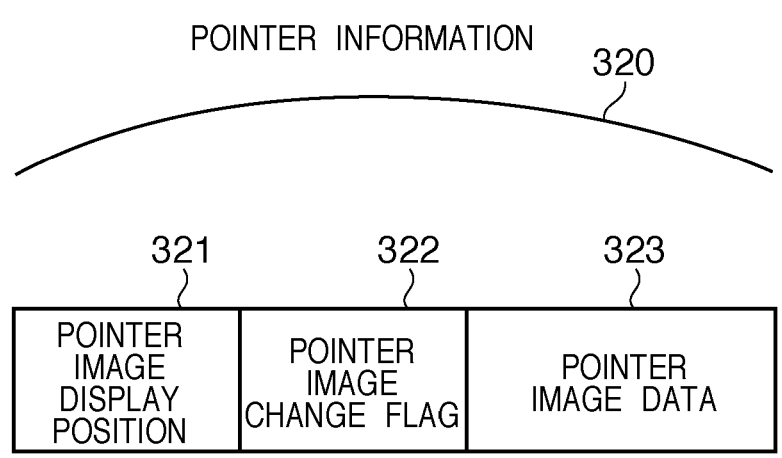
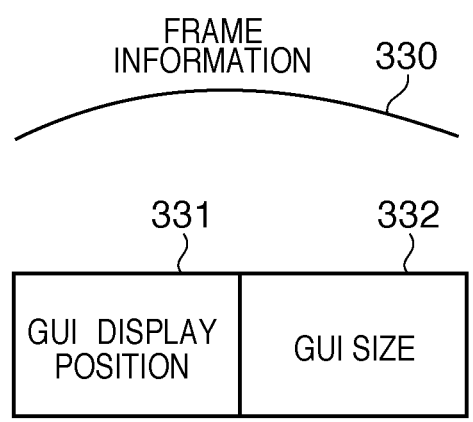

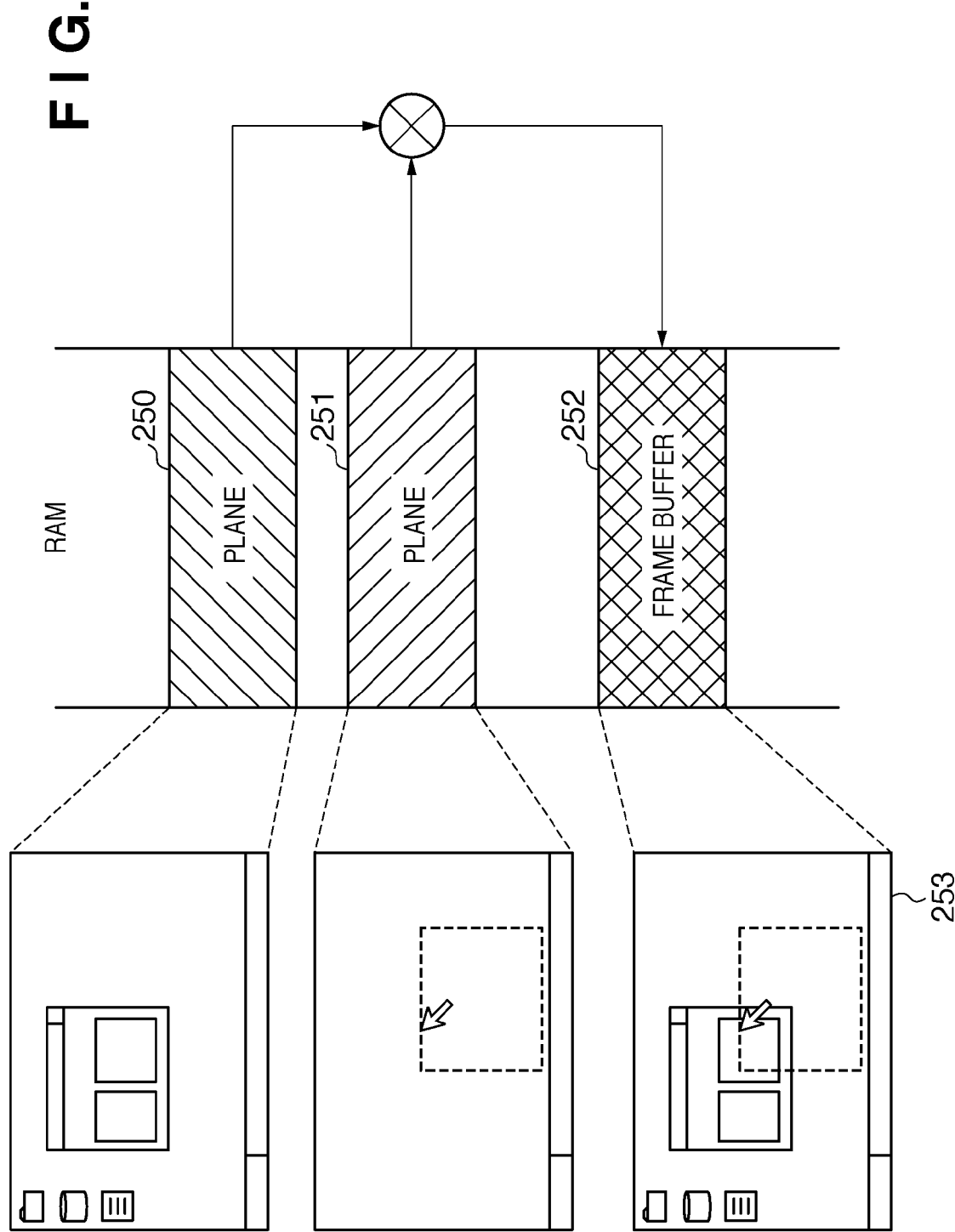

INFORMATION PROCESSING DEVICE, DISPLAY DEVICE, DISPLAY SYSTEM, METHOD FOR CONTROLLING INFORMATION PROCESSING DEVICE, AND METHOD FOR CONTROLLING DISPLAY DEVICE

BACKGROUND OF THE INVENTION

1. Field of the Invention

The present invention relates to an information processing device, a display device, a display system, a method for controlling an information processing device, and a method for controlling a display device.

2. Description of the Related Art

In recent years, display systems in which a display device such as a display or a projector is connected to an information processing device such as a personal computer (PC) are known. In such a display system, a graphical user interface (GUI) screen generated by an operating system (OS) operating on the PC is shown in the display device. Moreover, display systems in which an information processing device and a display device are connected through a network (wireless LAN, for example) are also known.

In general, since the data volume of a GUI screen is significantly large, when an information processing device and a display device are connected through a network, it takes a certain amount of time for the data of the GUI screen generated in the information processing device to arrive at the display device. As a result, there is a possibility that there is a delay in displaying the GUI screen in the display device.

In order to reduce data volume to be transmitted, Japanese Patent Laid-Open No. 2005-257948 discloses a technology in which a layer that should be displayed and a layer that should not be displayed are distinguished with each other, and only the layer that should be displayed is transmitted. Moreover, Japanese Patent Laid-Open No. 2005-257948 also discloses a technology for improving the response speed of a pointer in which only the coordinates of the pointer are transmitted when a pointer movement is detected.

Today's GUI screen, in general, contains various objects such as windows and icons. Users can change the position or the size of an object with a so-called drag operation using a mouse.

When the technology disclosed in Japanese Patent Laid-Open No. 2005-257948 is used to change the position or the size of an object with a drag operation, the position of a pointer that is displayed can be updated promptly in the display device. However, since the data volume of image data representing an object is generally much larger than that of the data indicating coordinates of a pointer, it takes a relatively long time to display an object whose position or size has changed in the display device. As a result, in the display device, the display change of an object cannot keep up with the movement of the pointer, which gives the user a sense of incongruity.

SUMMARY OF THE INVENTION

The present invention is carried out in view of such circumstances. The present invention provides a technology for a display system in which an image generated by an information processing device is displayed by a display device connected to the information processing device, that permits users to recognize a change of an object within the image more quickly.

According to a first aspect of the present invention, there is provided an information processing device comprising: a generating unit configured to generate an image containing a predetermined object; a transmitting unit configured to transmit, to a display device, pointer position information indicating a position of a pointer for pointing an arbitrary position within the image and image data representing the image; a receiving unit configured to receive a moving instruction that instructs a display position of the predetermined object to move by moving the pointer; a generation control unit configured to control, in response to the moving instruction, the generating unit so that an image containing the predetermined object at a post-movement position is generated; and a transmission control unit configured to control the transmitting unit, wherein the transmission control unit controls, in response to the moving instruction, the transmitting unit so that the pointer position information indicating a post-movement position of the pointer and object position information indicating a post-movement position of the predetermined object are transmitted to the display device, and then, after the pointer position information and the object position information have been transmitted, the image data representing the image generated by the generating unit is transmitted to the display device.

According to a second aspect of the present invention, there is provided a display device comprising: an image data receiving unit configured to receive image data from an information processing device; a pointer position information receiving unit configured to receive, from the information processing device, pointer position information indicating a position of a pointer for pointing an arbitrary position within an image represented by the image data; a display unit configured to perform display by superimposing a pointer image on the image represented by the image data at a position indicated by the pointer position information; an object position information receiving unit configured to receive, from the information processing device, object position information indicating a post-movement position of a predetermined object contained within the image; and a display control unit configured to control the display unit so that the image is displayed while an auxiliary image indicating the post-movement position of the predetermined object along with the pointer image being superimposed thereon, when the object position information is received by the object position information receiving unit.

According to a third aspect of the present invention, there is provided a display system comprising an information processing device and a display device, the information processing device comprising: a generating unit configured to generate an image containing a predetermined object; a transmitting unit configured to transmit, to the display device, pointer position information indicating a position of a pointer for pointing an arbitrary position within the image and image data representing the image; a receiving unit configured to receive a moving instruction that instructs a display position of the predetermined object to move by moving the pointer; a generation control unit configured to control, in response to the moving instruction, the generating unit so that an image containing the predetermined object at a post-movement position is generated; and a transmission control unit configured to control the transmitting unit, wherein the transmission control unit controls, in response to the moving instruction, the transmitting unit so that the pointer position information indicating a post-movement position of the pointer and object position information indicating a post-movement position of the predetermined object are transmitted to the display device, and then, after the pointer position information and the object position information have been transmitted, the image data representing the image generated by the generating unit is transmitted to the display device, and the display device comprising: an image data receiving unit configured to receive image data transmitted from the information processing device; a pointer position information receiving unit configured to receive, from the information processing device, pointer position information indicating a position of a pointer for pointing an arbitrary position within an image represented by the image data; a display unit configured to perform display by superimposing a pointer image on the image represented by the image data at a position indicated by the pointer position information; an object position information receiving unit configured to receive, from the information processing device, object position information indicating a post-movement position of a predetermined object contained within the image; and a display control unit configured to control the display unit so that the image is displayed while an auxiliary image indicating the post-movement position of the predetermined object along with the pointer image being superimposed thereon, when the object position information is received by the object position information receiving unit.

According to a fourth aspect of the present invention, there is provided a method for controlling an information processing device, comprising: a generating step of generating an image containing a predetermined object; a transmission step of transmitting, to a display device, pointer position information indicating a position of a pointer for pointing an arbitrary position within the image and image data representing the image; a receiving step of receiving a moving instruction that instructs a display position of the predetermined object to move by moving the pointer; a generation control step of controlling, in response to the moving instruction, the generating step so that an image containing the predetermined object at a post-movement position is generated; and a transmission control step of controlling the transmitting step, wherein the transmission control step controls, in response to the moving instruction, the transmitting step so that the pointer position information indicating a post-movement position of the pointer and object position information indicating a post-movement position of the predetermined object are transmitted to the display device, and then, after the pointer position information and the object position information have been transmitted, the image data representing the image generated in the generating step is transmitted to the display device.

According to a fifth aspect of the present invention, there is provided a method for controlling a display device comprising: an image data receiving step of receiving image data from an information processing device; a pointer position information receiving step of receiving, from the information processing device, pointer position information indicating a position of a pointer for pointing an arbitrary position within an image represented by the image data; a display step of performing display by superimposing a pointer image on the image represented by the image data at a position indicated by the pointer position information; an object position information receiving step of receiving, from the information processing device, object position information indicating a post-movement position of a predetermined object contained within the image; and a display control step of controlling the display step so that the image is displayed while an auxiliary image indicating the post-movement position of the predetermined object along with the pointer image being superimposed thereon, when the object position information is received in the object position information receiving step.

With the configurations described above, in a display system in which an image generated by an information processing device is displayed by a display device connected to the information processing device, the present invention permits users to recognize a change of an object within the image more quickly.

Further features of the present invention will become apparent from the following description of exemplary embodiments with reference to the attached drawings.

BRIEF DESCRIPTION OF THE DRAWINGS

FIG. 2 is a diagram showing various data transmitted from a PC 100 to a projector 200.

FIG. 10 is a conceptual diagram of a process of superimposing a pointer image and a frame image on an image in a PC screen.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
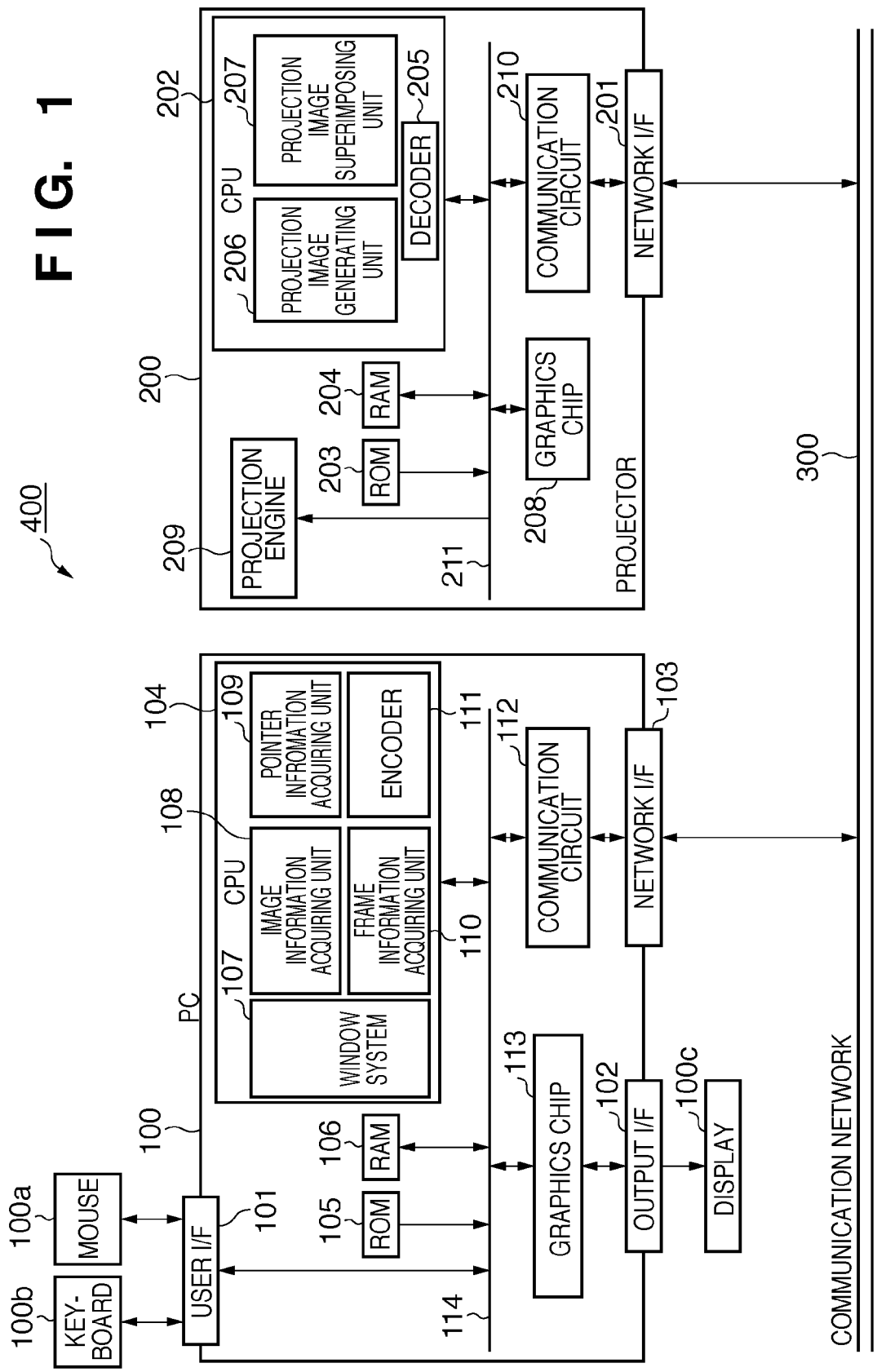
FIG. 1 is a block diagram showing a configuration of a display system 400 according to a first embodiment.

FIG. 1 is a block diagram showing the configuration of a display system 400 according to a first embodiment of the present invention. The display system 400 is provided with a PC 100 (information processing device) and a projector 200 (display device), and the PC 100 and the projector 200 are connected through a communication network 300.

The PC 100 transmits image data representing an image displayed in the display to the projector 200 through the communication network 300. Any transfer method can be used, regardless of wireless or wired, and, for example, wireless LAN, wired LAN, wired USB, wireless USB, IEEE1394 and the like can be used. Although the present invention is effective especially when the communication speed is slow in the communication network 300, this fact does not prevent the present invention from being used in a high communication speed environment. Therefore, the PC 100 and the projector 200 may be connected through an analog RGB cable, instead of the communication network 300.

The projector 200 receives the image data transmitted from the PC 100 and displays (projects) images after converting the image data to a format that permits output. At this time, a pointer can be operated on the window system of the PC 100 with a mouse 100a, and information on the pointer display position (pointer position information) is transmitted to the projector 200 through a different path from the image data. This is performed for the purpose of improving the display response speed of the pointer image displayed by the projector 200 and realizing natural pointer movement on the projector screen for users by transmitting only the pointer position information, which is made up of a small amount of data. It should be noted that the display device is not limited to the projector 200 but may be a display connected to the PC 100 through the communication network 300, for example.

Next, the configurations of the PC 100 and the projector 200 will be described more specifically. The PC 100 is provided with a mouse 100a, a keyboard 100b, a display 100c, a user I/F 101 and an output I/F 102. The PC 100 is also provided with a communication circuit 112 for exchanging signals through a network I/F 103 serving as a connecting interface with the projector 200. The PC 100 is also provided with a ROM 105 for storing a control program in which processing steps of a CPU 104 are written, a RAM 106 serving as work memory, and a graphics chip 113 for outputting images. Data exchange between these blocks is performed through an internal bus 114. The CPU 104 is provided with a window system 107, which is a program for managing information such as desktop images or pointer images that are output to the display 100c. The window system 107 can be realized by an operating system (OS) such as Microsoft Windows (registered trade mark) and Apple Macintosh (registered trade mark), for example. The window system 107 contains a pointer for pointing an arbitrary position in an image. Furthermore, the CPU 104 is provided with an image information acquiring unit 108 that acquires an image to be output to the display 100c from the window system 107 and a pointer information acquiring unit 109 that acquires a display position of a pointer image (that is, a position pointed by the pointer). The CPU 104 is also provided with a frame information acquiring unit 110 that acquires the position and the size of a currently operated window. The CPU 104 is also provided with an encoder 111 that converts the obtained information to a format allowing the information to be transmitted to the projector 200.

The projector 200 is provided with a communication circuit 210 for exchanging signals through a network I/F 201 serving as a connecting interface with the PC 100. The projector 200 is also provided with a ROM 203 for storing a control program in which processing steps of a CPU 202 are written, a RAM 204 serving as work memory and a graphics chip 208 for outputting images. The projector 200 is provided with a projection engine 209 composed of a LCD panel to which input videos are projected and its driver, a lens and a driving system and a light source thereof. Also, data exchange between these blocks is performed through an internal bus 211. The CPU 202 is provided with a decoder 205 that converts data received from the PC 100 to a format allowing the data to be processed, and a projection image generating unit 206 that generates, from the converted data, images for the screen of the PC 100, pointer images, and frame images. The CPU 202 is also provided with a projection image superimposing unit 207 that generates images to be displayed on the display by superimposing the generated image.

Next, various data to be transmitted from the PC 100 to the projector 200 will be described with reference to FIG. 2. As shown in FIG. 2, there are three types of data, that is, image information 310, pointer information 320 and frame information 330 as the data transmitted from the PC 100 to the projector 200.

The image information 310 includes an image display position 311, an image size 312 and image data 313. The image data 313 represents a screen image of the window system 107 obtained by the image information acquiring unit 108 in FIG. 1. Also, the image display position 311 and the image size 312 indicate respectively the position and the size when displaying the image on the projector screen of the projector 200.

The pointer information 320 includes a pointer image display position 321 (pointer position information), a pointer image change flag 322, and pointer image data 323. The pointer image display position 321 indicates the pointer display position of the window system 107 obtained by the pointer information acquiring unit 109 in FIG. 1. Here, in order to make the pointer image in the PC 100 to be identical to the pointer image projected by the projector 200, it is necessary to transmit the pointer image data 323 to the projector 200. In this case, the PC 100 acquires the pointer image data 323 through the pointer information acquiring unit 109. It is sufficient to transmit the pointer image data 323 to the projector 200 only once. Therefore, as long as there is no change in the pointer image, the PC 100 transmits the pointer image change flag 322 that has been set to "0" meaning "no change", and does not transmit the pointer image data 323. When there is a change in the pointer image, the PC 100 sets the pointer image change flag 322 to "1" meaning "changed", stores the changed pointer image data as the pointer image data 323, and transmits them.

The frame information 330 (object position information) includes a GUI display position 331 and a GUI size 332. The PC 100 detects a currently operated GUI (certain objects such as windows and icons) in the window system 107 with the frame information acquiring unit 110 in FIG. 1, and also acquires information on their positions and sizes. The acquired position information corresponds to a GUI display position 331 and the acquired size corresponds to a GUI size 332.

Figure 3:
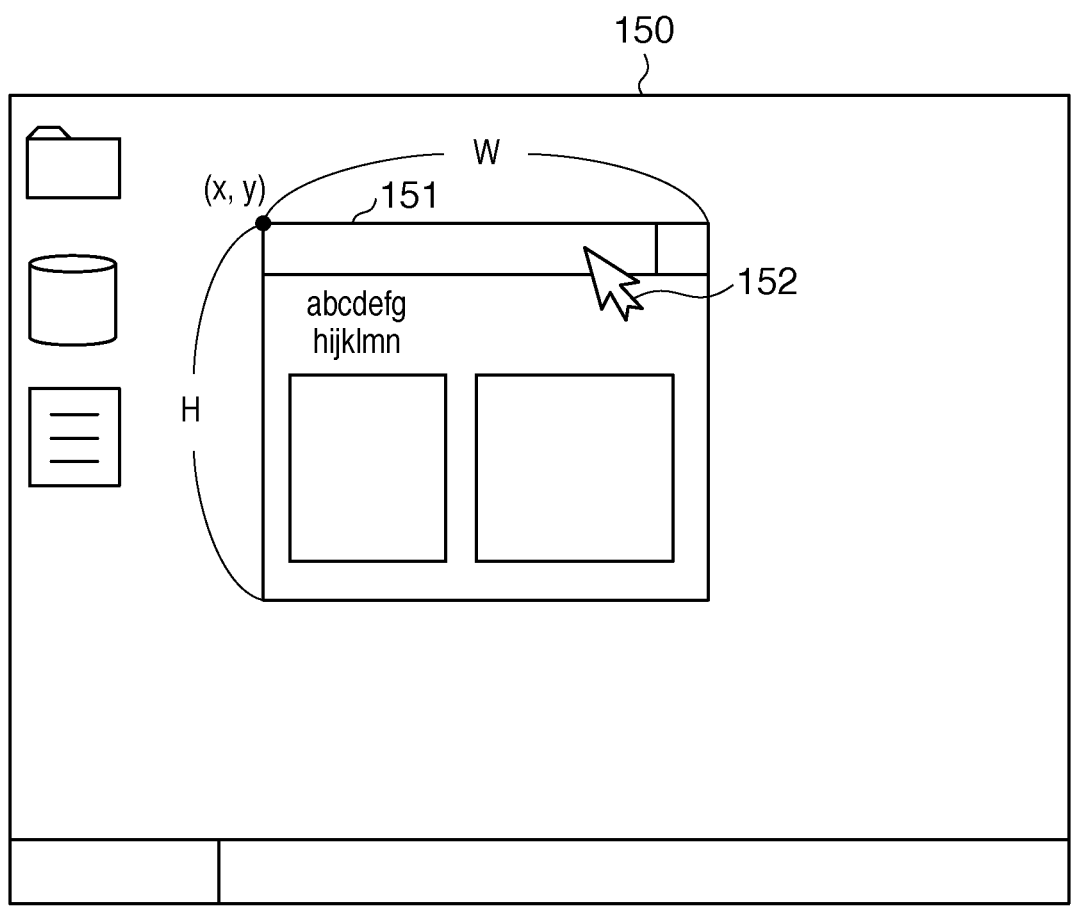
FIG. 3 is a diagram showing a desktop screen 150 of a window system 107.

The frame information 330 will be described more specifically with reference to FIG. 3. FIG. 3 shows a desktop screen 150 of the window system 107 shown on the display 100c of the PC 100. A pointer 152 is displayed while being superimposed on the desktop screen 150. In FIG. 3, it is assumed that the window system 107 is receiving a moving instruction (drag operation) instructing a window 151 to move by moving the pointer 152. In this case, the window 151 is a currently operated GUI (operation target). The GUI display position 331 of the frame information 330 indicates the coordinates (x, y) of the upper left corner of the window 151, and the GUI size 332 indicates the width W and the height H of the window 151.

It should be noted that the configuration of the frame information 330 is not limited to those described above. For example, the frame information 330 may contain coordinates of the four corners of the window 151. Alternatively, the frame information 330 may contain only the coordinates of the upper right corner of the window 151. In this embodiment, for the frame information 330, it is important to indicate the post-movement position of the window 151 than to indicate a precise shape of the window 151. Therefore, any format can be used for the frame information 330, as long as the frame information 330 can indicate the position of the window 151 that has moved as a result of a drag operation, and such information is also referred to as object position information in this embodiment.

Figure 4:
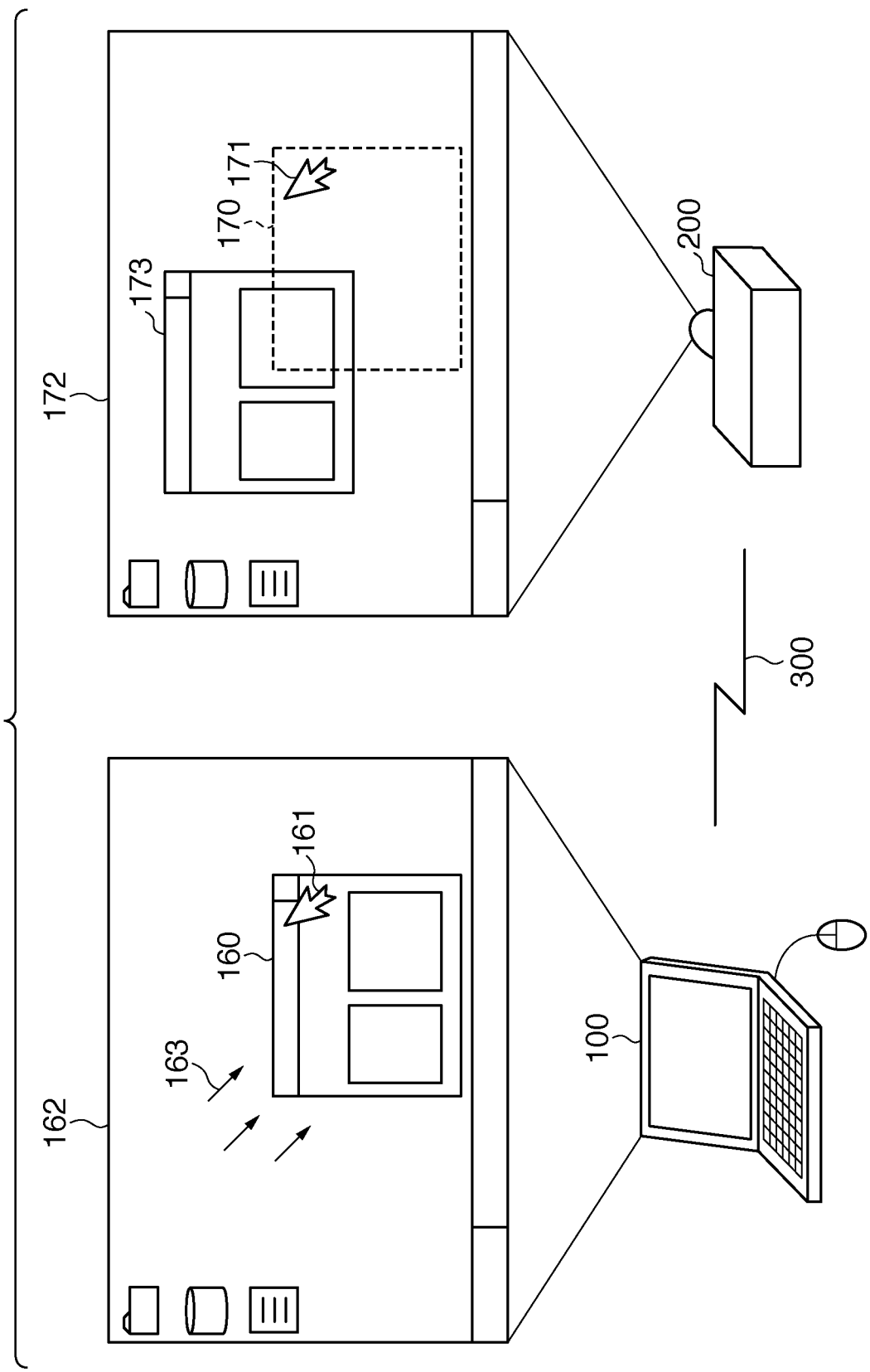
FIG. 4 is a conceptual diagram of a drag operation according to the first embodiment.

FIG. 4 is a conceptual diagram of a drag operation according to the first embodiment. The PC 100 and the projector 200 are connected through the communication network 300 (e.g. wireless LAN). The PC 100 transmits image data representing a display screen 162 to the projector 200, and the projector 200 displays a projector projection screen 172 based on the image data. At this time, when a mouse pointer 161 of the PC 100 is operated by a user and the window 160 moves (see an arrow 163), a pointer image 171 moves on the projector projection screen 172. However, a window 173 corresponding to the window 160 does not move. Instead, a frame image 170 is displayed at a position corresponding to the post-movement window 160.

Figure 5:
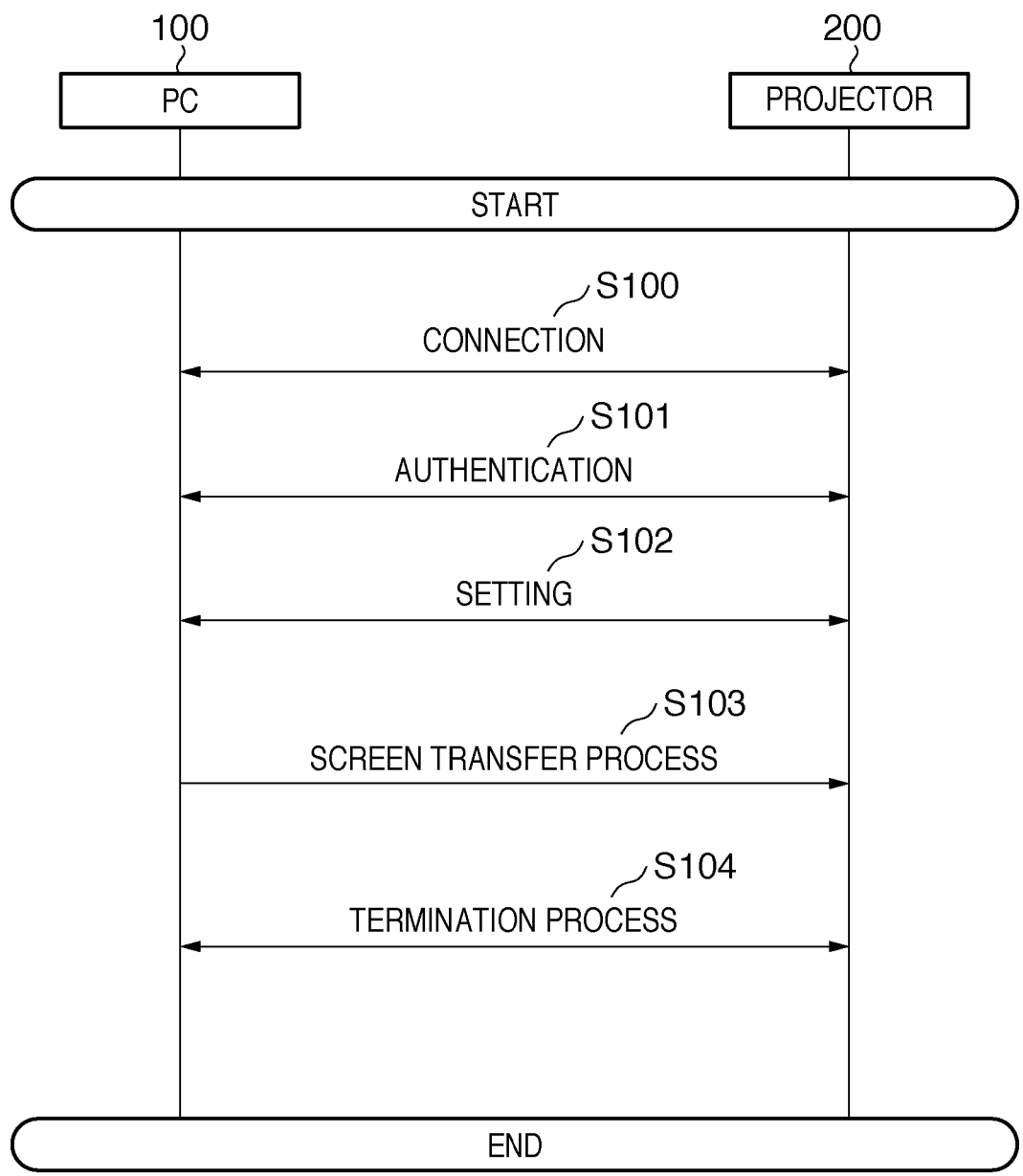
FIG. 5 is a sequence diagram showing a process of communications between the PC 100 and the projector 200 according to the first embodiment.

FIG. 5 is a sequence diagram showing a process of communications between the PC 100 and the projector 200 in the first embodiment. In a step S100, a user connects the network I/F 103 of the PC 100 with the network I/F 201 of the projector 200 through the communication network 300. In a step S101, the user performs an authentication process for transferring the screen of the PC 100 to the projector 200. This process is performed, for example, by a processing procedure such as entering a password that has been set in the projector 200 in advance with an application on the PC 100 side, sending out the password, and sending back an authentication result to the PC 100.

In a step S102, the CPU 104 of the PC 100 and the CPU 202 of the projector 200 perform a setting process of the display system 400. Here, processing is performed such as for notifying between the PC 100 and the projector 200 of their respective resolutions.

In a step S103, the PC 100 starts a screen transfer process (which will be described more specifically later with reference to FIGS. 6 to 10). With this process, a display process as described with reference to FIG. 4 is realized. The screen transfer process continues until the user instructs termination.

When termination of the screen transfer process is instructed by the user, the PC 100 notifies the projector 200 of the termination of the screen transfer in a step S104, and the projector 200 terminates the screen transfer mode.

Figure 6:
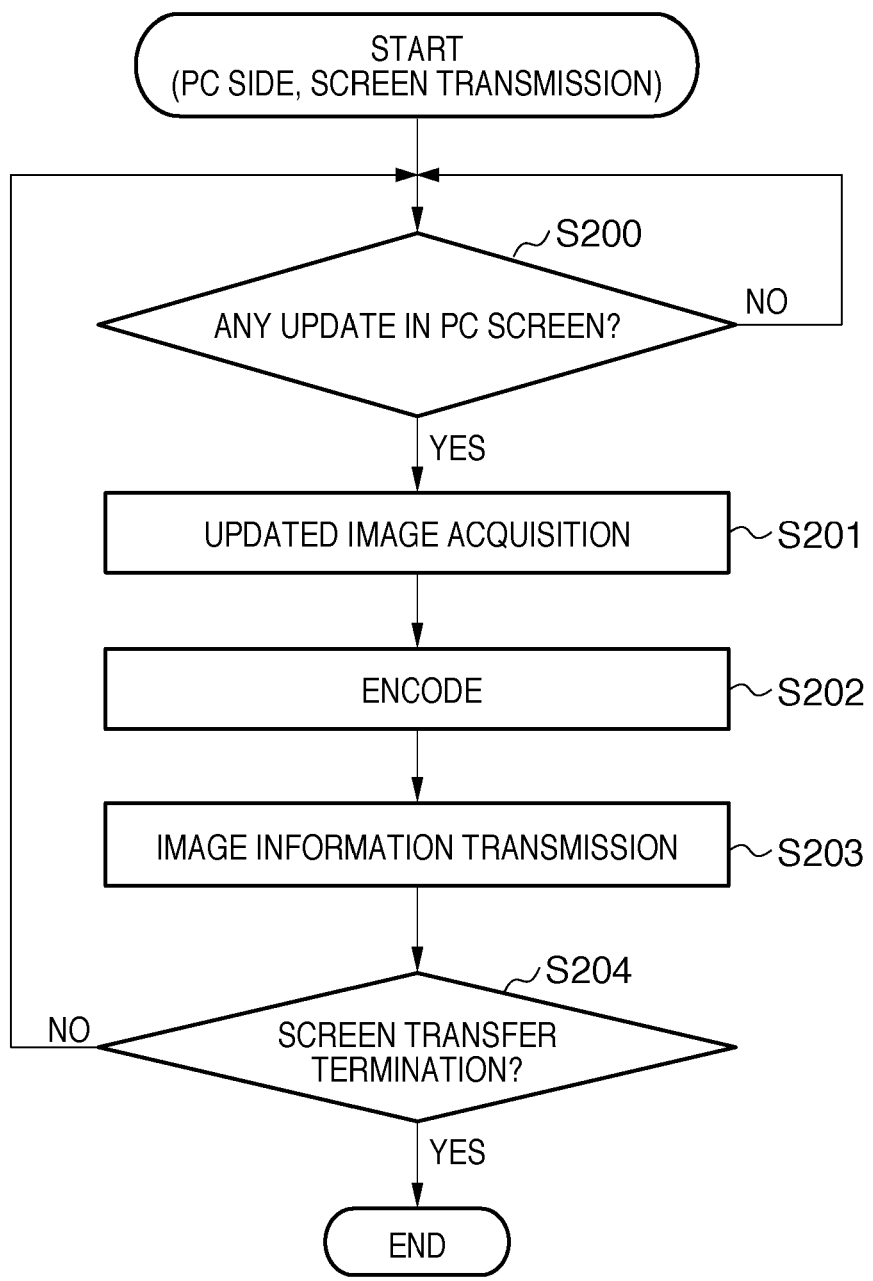
FIG. 6 is a flowchart showing details of a process of the PC 100 transmitting a screen image in a step S103 in FIG. 5.
Figure 7A:
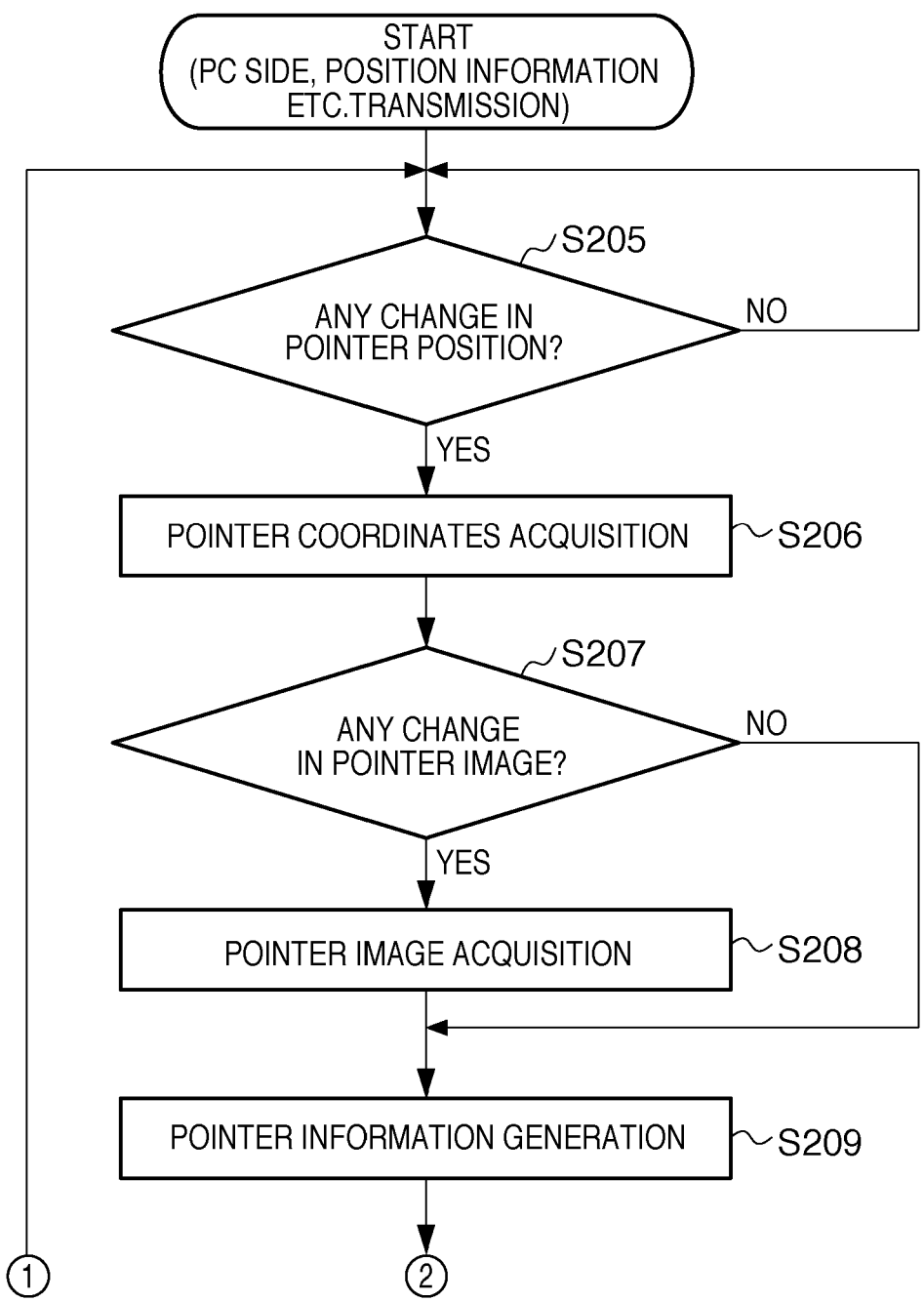
FIGS. 7A and 7B are flowcharts showing details of a process of the PC 100 transmitting position information and the like in the step S103 in FIG. 5.
Figure 7B:
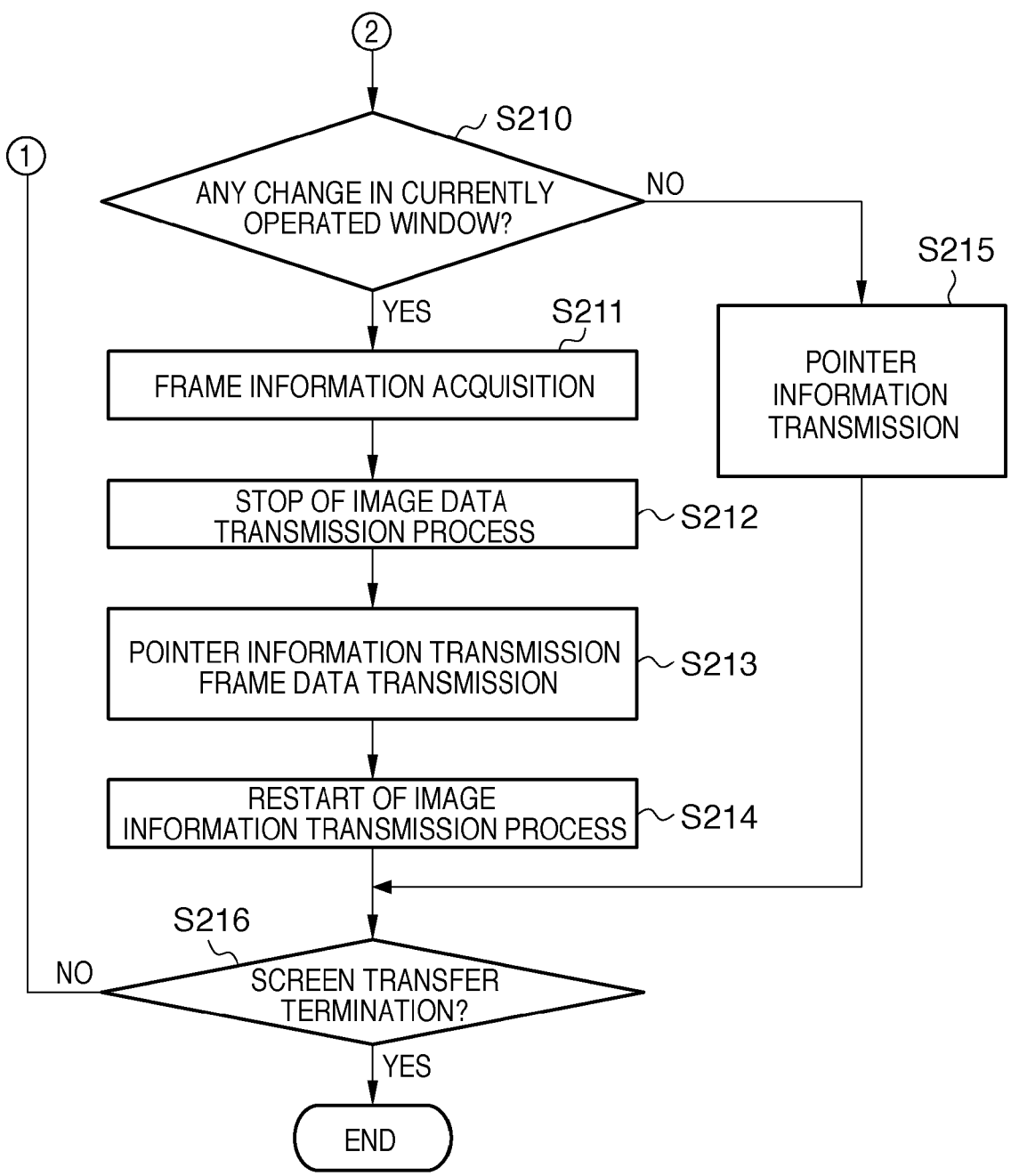

FIG. 6 is a flowchart showing details of a process of the PC 100 transmitting a screen image in the step S103 in FIG. 5. FIGS. 7A and 7B are flowcharts showing details of a process of the PC 100 transmitting position information and the like in the step S103 in FIG. 5. The processes of FIG. 6 and FIGS. 7A and 7B are performed in parallel. In order words, as described in detail below, the image data representing a screen image and the position information are transmitted separately, and moreover the transmission of the position information is given priority over the transmission of the image data. Thus, when the window 160 is moved by a drag operation in the PC 100 as described in FIG. 4, the pointer image 171 is moved and the frame image 170 is displayed in a short delay time.

Referring to FIG. 6, when the image information acquiring unit 108 detects that a screen (PC screen) displayed by the window system 107 is updated in a step S200 (Yes in the step S200), the processing proceeds to a step S201. It is also assumed that the PC screen has been updated immediately after the start of the screen transfer process, although this is not explicitly shown in FIG. 6. In the step S201, the image information acquiring unit 108 detects the updated region in the PC screen and acquires the region as an updated image. The processing in the steps S200 and S201 can be realized, for example, using a functional set (WIN 32 API) that is provided as the standard when Windows (registered trade mark) is used as the OS of the PC 100. Specifically, for example, the image information acquiring unit 108 detects a redrawing event notified from the OS and acquires a minimum rectangular image containing the updated region.

For example, when a window is moved by a drag operation, the CPU 104 and the window system 107 function as generation control units, and generate an image containing the window at the post-movement position. This image is acquired by the image information acquiring unit 108 in the step S201.

In a step S202, the image information acquiring unit 108 generates the image information 310 described with reference to FIG. 2, based on the updated image acquired in the step S201. The encoder 111 compresses the image data 313 (e.g. run-length compression).

In a step S203, the CPU 104 transmits the image information 310 to the projector 200 with the communication circuit 112 (S203).

In a step S204, the CPU 104 determines whether or not an instruction of terminating screen transfer is issued, and the processing ends when there is an instruction of terminating screen transfer (Yes in the step S204). Otherwise, the processing returns to the step S200.

Next, referring to FIGS. 7A and 7B, in a step S205, the pointer information acquiring unit 109 determines whether or not the position of the pointer has changed. If there is a change, the processing proceeds to a step S206, and the pointer information acquiring unit 109 acquires the coordinates of the pointer. It is also assumed that the position of the pointer has changed immediately after the start of the screen transfer process, although this is not explicitly shown in FIG. 7A. Then, in a step S207, the pointer information acquiring unit 109 determines whether or not the pointer image has changed. If there is a change, the processing proceeds to a step S208. If not, the processing proceeds to a step S209. In the step S208, the pointer information acquiring unit 109 acquires the pointer image. The processing from the steps S205 to S208 can be realized by, for example, using WIN 32 API, similarly to the processing of the steps S200 and S201. This also applies to the processing of the frame information acquiring unit 110 described later. Next, in the step S209, the pointer information acquiring unit 109 generates the pointer information 320 described with reference to FIG. 2, based on the information acquired in the steps S206 and S208.

In a step S210, the frame information acquiring unit 110 determines whether or not the position or the size of a currently operated window has changed. A change in the window is detected when the user I/F 101 serving as a receiving unit receives an instruction for movement with a drag operation. If a window change is detected, the processing proceeds to a step S211. If not, the processing proceeds to a step S215. In the step S215, the CPU 104 transmits the pointer information 320 to the projector 200.

In the step S211, the frame information acquiring unit 110 acquires the frame information (position and size) of the window, and generates the frame information 330 described with reference to FIG. 2. In a step S212, the frame information acquiring unit 110 transmits a stop message to the image information acquiring unit 108. Since this stops detecting an update of the PC screen, the image information 310 is not transmitted. In a step S213, the CPU 104 transmits the pointer information 320 and the frame information 330 to the projector 200. In a step S214, the frame information acquiring unit 110 transmits a restart message to the image information acquiring unit 108. As a result of transmission control by the processing in the steps S212 to S214, when there is a window change, the pointer information 320 and the frame information 330, which have small amounts of data, are transmitted ahead of the image information 310, which has a large amount of data, to the projector 200. When a window change is detected again before the completion of the transmission of the image information 310, the latest pointer information 320 and the frame information 330 are transmitted preferentially since the transmission of the image information 310 is cancelled again in the step S212.

In a step S216, the CPU 104 determines whether or not there is an instruction of terminating screen transfer, and the processing ends if there is an instruction of terminating image transfer (Yes in the step S216). If not, the processing returns to the step S205.

It should be noted that although in the above description, an expression "currently operated window" is used, an object to be operated with a drag operation is not limited to a window, and for example, an icon can be used.

Figure 8:
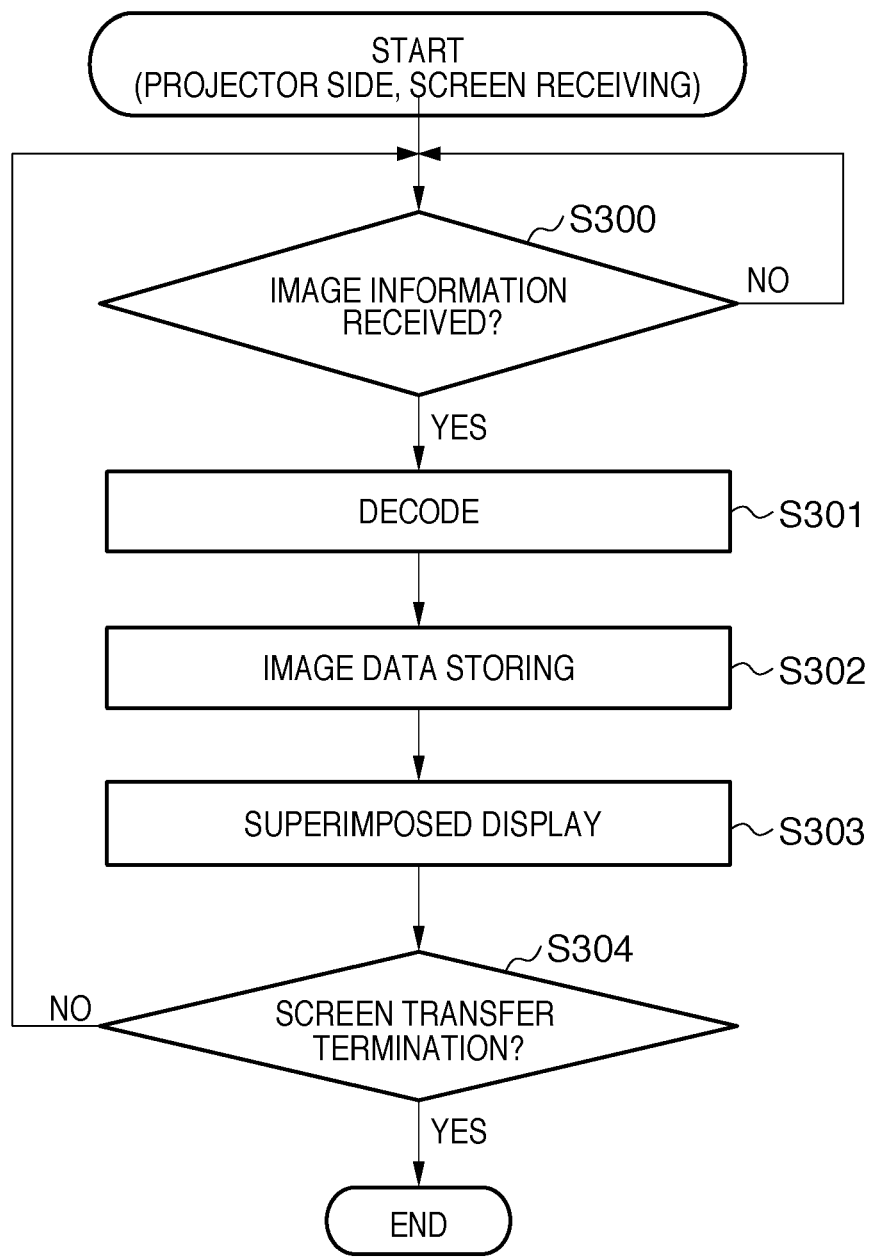
FIG. 8 is a flowchart showing details of a process of the projector 200 receiving a screen image in the step S103 in FIG. 5.
Figure 9:
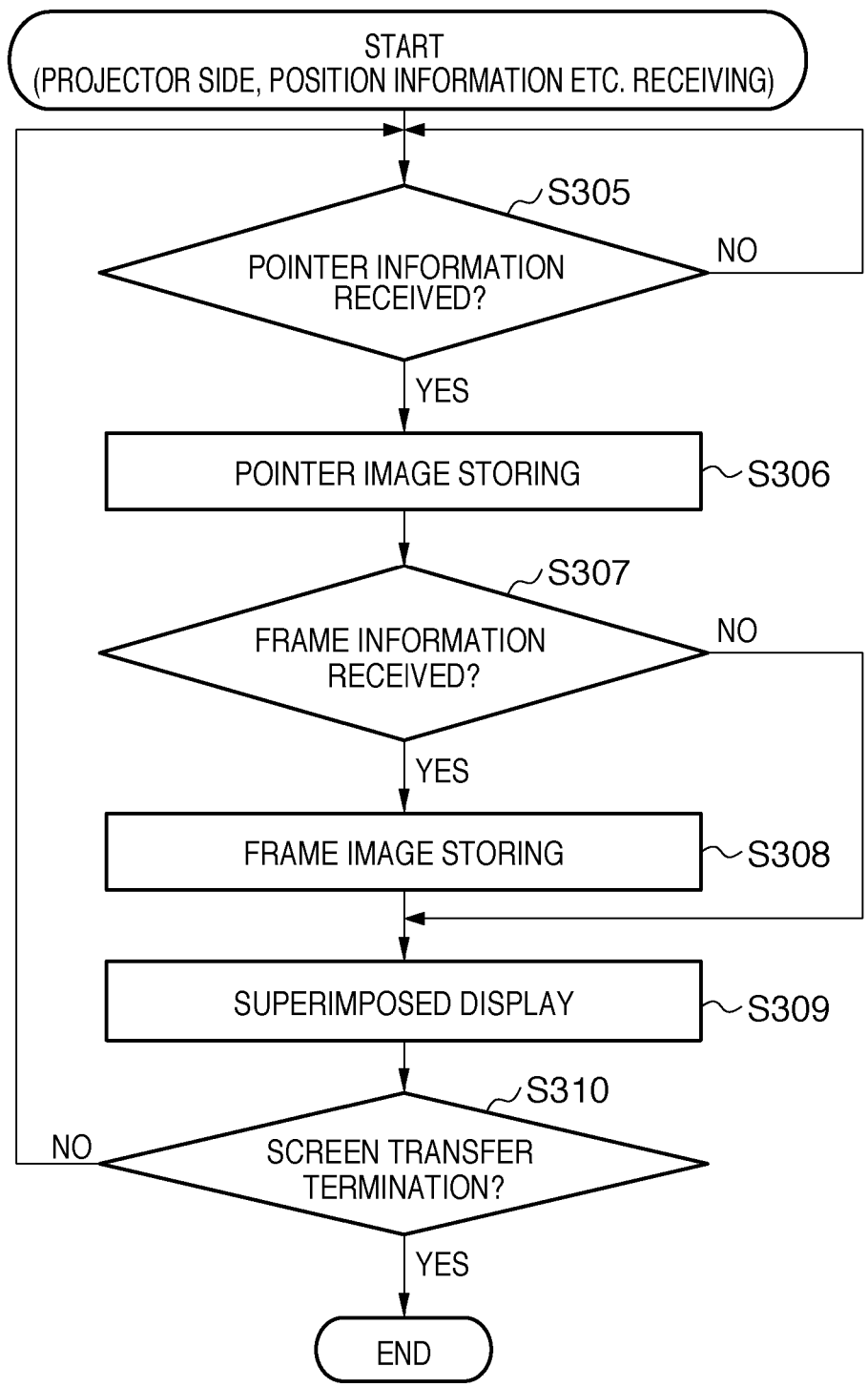
FIG. 9 is a flowchart showing details of a process of the projector 200 receiving position information and the like in the step S103 in FIG. 5.

Next, the processing on the projector 200 side will be described. FIG. 8 is a flowchart showing details of a process of the projector 200 receiving a screen image in the step S103 in FIG. 5. FIG. 9 is a flowchart showing details of a process of the projector 200 receiving the position information and the like in the step S103 in FIG. 5. The processes of FIG. 8 and FIG. 9 are performed in parallel.

With reference to FIG. 8, in a step S300, the CPU 202 (image data receiving unit) determines whether or not the image information 310 has been received from the PC 100. If the image information 310 has been received, the processing proceeds to a step S301. In the step S301, the decoder 205 decodes the image data 313 contained in the image information 310. In a step S302, the projection image generating unit 206 stores the decoded image data to a plane 250 (see FIG. 10) of the RAM 204. In a step S303, the projection image superimposing unit 207 performs a superimposed display of an image by moving the image data in the plane 250 to a frame buffer 252 (described in detail later with reference to a step S309 in FIG. 9). In the processing of FIG. 8, in the display system 400 of this embodiment, the image data of the entire screen of the PC 100 is transmitted immediately after the start of the screen transfer process, and thereafter, the image data of only an updated region of the PC 100 is transmitted. In other words, the image data stored in the plane 250 is data obtained by overwriting the image data of the entire screen with the received updated image data.

In a step S304, the CPU 202 determines whether or not a termination notification of the screen transfer process has been received. If received, the processing of this flowchart ends, and if not, the processing returns to the step S300.

Next, referring to FIG. 9, in a step S305, the CPU 202 (pointer position information receiving unit) determines whether or not the pointer information 320 has been received from the PC 100. If the pointer information 320 has been received, the processing proceeds to a step S306. In the step S306, the projection image generating unit 206 generates a pointer image based on the pointer information 320 obtained in the step S305, and stores it to a plane 251 (see FIG. 10) of the RAM 204.

In a step S307, the CPU 202 (object position information receiving unit) determines whether or not the frame information 330 has been received from the PC 100. If the frame information 330 has been received, the processing proceeds to a step S308, and if not, the processing proceeds to a step S309. In the step S308, the projection image generating unit 206 generates an auxiliary image based on the received frame information 330 in the step S307, and stores it to the plane 251 (see FIG. 10) of the RAM 204. For the auxiliary image, any image can be used, as long as it can point the post-movement position of an object (e.g. window 173 in FIG. 4). For example, in the case where the frame information 330 is of a format shown in FIG. 2, the projection image generating unit 206 can generate an outline image showing the outline (frame image 170 in FIG. 4) of a post-movement object as the auxiliary image.

In the step S309, the projection image superimposing unit 207 moves the image data on the plane 251 to the frame buffer 252. As a result, as shown by a reference numeral 253 in FIG. 10, the pointer image is displayed while being superimposed on the image of the PC screen. When the frame information 330 is further received, the frame image (auxiliary image) is also superimposed and displayed thereon. In other words, the projection image generating unit 206 and the projection image superimposing unit 207 function as a display control unit, and perform control such that the image of the PC screen is displayed with the auxiliary image along with the pointer image superimposed thereon, if the frame information 330 is received. It should be noted, although not shown in the drawings, that when next image information 310 is received in the step S300 in FIG. 8 after the superimposition of the auxiliary image, the projection image generating unit 206 stops storing the auxiliary image to the plane 251. As a result, the superimposed display of the frame image is also stopped.

In a step S310, the CPU 202 determines whether or not an notification of terminating screen transfer has been received. If received, the processing of this flowchart ends, and if not, the processing returns to the step S305.

As described above, according to this embodiment, in the case where an object such as a window has moved in the screen of the PC 100, the PC 100 transmits object position information indicating the post-movement position of the object to the projector 200. After the transmission of the object position information, the PC 100 transmits the image data of the screen after the movement of the object to the projector 200. As a result, the projector 200 can display promptly the auxiliary image indicating the post-movement position of the object. Therefore, this makes it possible for a user to recognize a change of the object in the image promptly.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113420, filed on May 17, 2010, which is hereby incorporated by reference herein in its entirety.

What is claimed is:

1. An information processing device comprising:
a connection unit configured to be connected to a first display device;

a generating unit configured to generate image data representing an image to be displayed on at least a part of the first display device;

a transmitting unit configured to transmit, to a second display device through a network, the image data and pointer position information indicating a position of a pointer for pointing an arbitrary position within the image;

a receiving unit configured to receive a moving instruction that instructs a display position of a predetermined object contained in the image displayed on the first device to move by moving the pointer;

a generation control unit configured to control, in response to the moving instruction, the generating unit so that image data representing an image containing the predetermined object at a post-movement position is generated; and a transmission control unit configured to control the transmitting unit, wherein when the receiving unit receives, as said moving instruction, a drag instruction for movement of the predetermined object by the pointer, (i) the predetermined object displayed on the first display device moves in accordance with the moving instruction, (ii) the transmission control unit controls the transmitting unit to stop transmission of the image data representing the image containing the predetermined object, (iii) the transmission control unit controls the transmitting unit so that the pointer position information indicating a post-movement position of the pointer and object position information indicating a post-movement position of the predetermined object are transmitted to the second display device through the network, and (iv) then, after the pointer position information and the object position information have been transmitted, the transmission control unit controls the transmitting unit to restart the transmission of the image data representing the image containing the predetermined object at the post-movement position.

2. The information processing device according to claim 1, wherein the transmitting unit transmits, to the second display device through the network, the image data generated by the generating unit in a compressed state.

3. The information processing device according to claim 1, wherein the object position information contains information on a size of the object or information on corner coordinates of the object.

4. The information processing device according to claim 1, wherein the second display device is a projecting device.

5. The information processing device according to claim 1, wherein the transmitting unit transmits the image data representing the image containing the predetermined object through a wireless communication line.

6. A display system comprising an information processing device, a first display device, and a second display device, the information processing device comprising:

a connection unit configured to be connected to the first display device;

a generating unit configured to generate image data representing an image to be displayed on at least a part of the first display device;

a transmitting unit configured to transmit, to the second display device through a network, the image data and pointer position information indicating a position of a pointer for pointing an arbitrary position within the image;

a receiving unit configured to receive a moving instruction that instructs a display position of a predetermined object contained in the image displayed on the first device to move by moving the pointer;

a generation control unit configured to control, in response to the moving instruction, the generating unit so that image data representing an image containing the predetermined object at a post-movement position is generated; and a transmission control unit configured to control the transmitting unit, wherein when the receiving unit receives, as said moving instruction, a drag instruction for movement of the predetermined object by the pointer, (i) the predetermined object displayed on the first display device moves in accordance with the moving instruction, (ii) the transmission control unit controls the transmitting unit to stop transmission of the image data representing the image containing the predetermined object, (iii) the transmission control unit controls the transmitting unit so that the pointer position information indicating a post-movement position of the pointer and object position information indicating a post-movement position of the predetermined object are transmitted to the second display device through the network, and (iv) then, after the pointer position information and the object position information have been transmitted, the transmission control unit controls the transmitting unit to restart the transmission of the image data representing the image containing the predetermined object at the post-movement position, and the second display device comprising:

an image data receiving unit configured to receive the image data transmitted from the information processing device through the network;

a pointer position information receiving unit configured to receive, from the information processing device through the network, the pointer position information indicating the position of the pointer for pointing the arbitrary position within the image represented by the image data;

a display unit configured to perform display by superimposing a pointer image on the image represented by the image data at the position indicated by the pointer position information;

an object position information receiving unit configured to receive, from the information processing device through the network, the object position information indicating the post-movement position of the predetermined object contained within the image represented by the image data; and a display control unit configured to control the display unit so that the image is displayed while an auxiliary image indicating the post-movement position of the predetermined object along with the pointer image being superimposed thereon, when the object position information is received by the object position information receiving unit.

7. The display system according to claim 6, wherein the display control unit controls the display unit so that the superimposition of the auxiliary image is stopped when next image data is received by the image data receiving unit.

8. The display system according to claim 6, wherein the auxiliary image is an outline image representing an outline of the predetermined object at the post-movement position.

9. The display system according to claim 6,
wherein the transmitting unit transmits, to the second display device through the network, the image data in a compressed state,
wherein the image data receiving unit receives the compressed image data, and
wherein the display unit decodes the compressed image data and performs display thereof.

10. The display system according to claim 6,
wherein the second display device is a projecting device.

11. The display system according to claim 6,
wherein the transmitting unit transmits the image data representing the image containing the predetermined object through a wireless communication line.

12. The display system according to claim 6,
wherein the image data receiving unit receives the image data through a wireless communication line.

13. A method for controlling an information processing device including a connection unit configured to be connected to a first display device, comprising:
a generating step of generating image data representing an image to be displayed on at least a part of the first display device;
a transmission step of transmitting, to a second display device through a network, the image data and pointer position information indicating a position of a pointer for pointing an arbitrary position within the image;
a receiving step of receiving a moving instruction that instructs a display position of a predetermined object contained in the image displayed on the first device to move by moving the pointer;
a generation control step of controlling, in response to the moving instruction, the generating step so that image data representing an image containing the predetermined object at a post-movement position is generated; and
a transmission control step of controlling the transmitting step,
wherein when the receiving step receives, as said moving instruction, a drag instruction for movement of the predetermined object by the pointer, (i) the predetermined object displayed on the first display device moves in accordance with the moving instruction, (ii) the transmission control step controls the transmitting step to stop transmission of the image data representing the image containing the predetermined object, (iii) the transmission control step controls the transmitting step so that the pointer position information indicating a post-movement position of the pointer and object position information indicating a post-movement position of the predetermined object are transmitted to the second display device through the network, and (iv) then, after the pointer position information and the object position information have been transmitted, the transmission control step controls the transmitting step to restart the transmission of the image data representing the image containing the predetermined object at the post-movement position.

14. A non-transitory computer-readable storage medium storing a program for causing a computer to execute the control method according to claim 13.

15. An information processing device comprising:
a connection unit configured to be connected to a first display device;
a generating unit configured to generate image data representing an image to be displayed on at least a part of the first display device;
a transmitting unit configured to transmit, to a second display device through a network, the image data and pointer position information indicating a position of a pointer for pointing an arbitrary position within the image;
a receiving unit configured to receive a moving instruction that instructs a display position of a predetermined object contained in the image displayed on the first device to move by moving the pointer;
a generation control unit configured to control, in response to the moving instruction, the generating unit so that image data representing an image containing the predetermined object at a post-movement position is generated; and
a transmission control unit configured to control the transmitting unit,
wherein when the receiving unit receives, as said moving instruction, a drag instruction for movement of the predetermined object by the pointer, (i) the predetermined object displayed on the first display device moves in accordance with the moving instruction, (ii) the transmission control unit controls the transmitting unit to stop transmission of the image data representing the image containing the predetermined object, and (iii) the transmission control unit controls the transmitting unit so that the pointer position information indicating a post-movement position of the pointer and object position information indicating a post-movement position of the predetermined object are transmitted to the second display device through the network.

16. The information processing device according to claim 15,
wherein the transmitting unit transmits, to the second display device through the network, the image data generated by the generating unit in a compressed state.

17. The information processing device according to claim 15,
wherein the object position information contains information on a size of the object or information on corner coordinates of the object.

18. The information processing device according to claim 15,
wherein the second display device is a projecting device.

19. The information processing device according to claim 15,
wherein the transmitting unit transmits the image data representing the image containing the predetermined object through a wireless communication line.

20. A method for controlling an information processing device including a connection unit configured to be connected to a first display device, comprising:
a generating step of generating image data representing an image to be displayed on at least a part of the first display device;
a transmission step of transmitting, to a second display device through a network, the image data and pointer position information indicating a position of a pointer for pointing an arbitrary position within the image;
a receiving step of receiving a moving instruction that instructs a display position of a predetermined object contained in the image displayed on the first device to move by moving the pointer;
a generation control step of controlling, in response to the moving instruction, the generating step so that image data representing an image containing the predetermined object at a post-movement position is generated; and a transmission control step of controlling the transmitting step, wherein when the receiving step receives, as said moving instruction, a drag instruction for movement of the predetermined object by the pointer, (i) the predetermined object displayed on the first display device moves in accordance with the moving instruction, (ii) the transmission control step controls the transmitting step to stop transmission of the image data representing the image containing the predetermined object, and (iii) the transmission control step controls the transmitting step so that the pointer position information indicating a post-movement position of the pointer and object position information indicating a post-movement position of the predetermined object are transmitted to the second display device through the network.

21. A non-transitory computer-readable storage medium storing a program for causing a computer to execute the control method according to claim 20.

* * * * *